(12) United States Patent
Gosper et al.

(10) Patent No.: US 8,856,649 B2
(45) Date of Patent: Oct. 7, 2014

(54) AGGREGATION LEVEL AND MEASURE BASED HINTING AND SELECTION OF CELLS IN A DATA DISPLAY

(75) Inventors: Julian Gosper, Vancouver (CA); Yahui Lu, Richmond (CA); Ian McAlpine, Vancouver (CA); Gavin Olle, Pitt Meadows (CA)

(73) Assignee: Business Objects Software Limited, Dublin (IE)

( * ) Notice: Subject to any disclaimer, the term of this patent is extended or adjusted under 35 U.S.C. 154(b) by 411 days.

(21) Appl. No.: 12/479,876

(22) Filed: Jun. 8, 2009

(65) Prior Publication Data

US 2010/0313127 A1 Dec. 9, 2010

(51) Int. Cl.
*G06F 3/00* (2006.01)
*G06F 3/048* (2013.01)
*G06F 17/24* (2006.01)

(52) U.S. Cl.
CPC .................................. *G06F 17/246* (2013.01)
USPC .......................................... 715/708; 715/810

(58) Field of Classification Search
CPC ................................................... G06F 17/246
USPC ........................................ 715/218, 708, 810
See application file for complete search history.

(56) References Cited

U.S. PATENT DOCUMENTS

| | | | | |
|---|---|---|---|---|
| 6,581,068 B1* | 6/2003 | Bensoussan et al. | | 1/1 |
| 7,010,523 B2* | 3/2006 | Greenfield et al. | | 1/1 |
| 7,559,033 B2* | 7/2009 | Boss et al. | | 715/769 |
| 7,716,257 B2* | 5/2010 | Thomson et al. | | 707/809 |
| 7,809,748 B2* | 10/2010 | Dong et al. | | 707/781 |
| 2002/0035565 A1* | 3/2002 | Shah et al. | | 707/100 |
| 2005/0223334 A1* | 10/2005 | Guido et al. | | 715/794 |
| 2006/0048044 A1* | 3/2006 | Genesereth et al. | | 715/503 |
| 2006/0294098 A1* | 12/2006 | Thomson et al. | | 707/6 |
| 2007/0016557 A1* | 1/2007 | Moore et al. | | 707/3 |
| 2007/0022386 A1* | 1/2007 | Boss et al. | | 715/764 |
| 2007/0282789 A1* | 12/2007 | Deshpande et al. | | 707/2 |
| 2009/0013270 A1* | 1/2009 | Helfman et al. | | 715/764 |
| 2009/0013287 A1* | 1/2009 | Helfman et al. | | 715/853 |
| 2009/0172525 A1* | 7/2009 | Mayor | | 715/273 |
| 2009/0327852 A1* | 12/2009 | MacGregor et al. | | 715/214 |
| 2010/0128988 A1* | 5/2010 | Kincaid | | 382/199 |

* cited by examiner

*Primary Examiner* — William Bashore
*Assistant Examiner* — Henry Orr

(57) ABSTRACT

Described herein are methods and systems for providing hints for and selecting cells within a crosstab that are compatible. Providing hints manifests the compatible cells and the selection is limited to compatible members. Hinting at unselected but compatible cells provides leads for user for other operations they may seek to pursue. User selections that include incompatible cells are corrected to ensure integrity of group operations to be performed on the selections. Compatibility is determined by aggregation level, measure and the like.

17 Claims, 7 Drawing Sheets

AGGREGATION LEVEL AND MEASURE BASED HINTING AND SELECTION OF CELLS IN A DATA DISPLAY

FIELD OF THE INVENTION

The invention relates to a graphical user interface. More precisely, the invention relates to selecting and providing hints for possible selections of comparable cells in a graphical user interface (GUI).

BACKGROUND OF THE INVENTION

Selections of multiple items displayed in a GUI allow more than one item to be selected so that a collective operation using the selected items can be performed. The selection of items defines the input to the collective operation and, therefore, precision is important. In particular, a user may wish to perform an operation on a small portion of items displayed within a GUI container, but the selections may or may not comprise contiguously displayed items.

There are a number of methods that can be employed for multiple selections in GUIs. Contiguous selections are made with pointer clicks and the pressing of a key, such as "SHIFT". The user defines a range of items by clicking on a start item, and while holding the appropriate key down, clicking on an end item. In this way, a contiguous group of items can be selected.

Non-contiguous selection can be made by clicking on a series of items while holding a key down, e.g. holding down "CTRL". A user discriminately selects items by clicking on one or more items.

Contiguous selections can also be made by dragging a cursor. The user selects a range of items by placing the cursor in an anchor position at one corner of the range and half-clicks the mouse button. Without releasing the mouse button, the user moves the cursor in any direction. When the desired range is selected, the user releases the mouse button.

The use of a keyboard input along with checking a button on a pointer is called a controlled click. The foregoing methods do not aid in the selection of items where precision and discrimination are important, nor do they minimize user-driven events, e.g., mouse clicks and keyboard inputs.

There are some GUIs in which the user can activate a "Click Lock" feature such that the interface emulates the holding down of a mouse button during a drag operation. Instead of having to hold the mouse button down for the duration of highlighting and dragging, the user presses and holds the mouse button down for a brief period and the computer locks the input from the button as if it were in the depressed state. In some GUIs, the user begins the drag motion prior to releasing the mouse button. The input is unlocked when the user presses the button again. This feature is found in many operating systems' GUIs and is useful to people with restricted mobility. However, this requires that item selection be done individually for a plurality of items since the Click Lock method does not support group selection.

The known methods of selecting multiple items in GUI are particularly limited when used for data selection in tabular data—table of data, cross tabulation (crosstab), matrix, and the like. For example, currently there is no ability to perform cell level selection in a table for analysis purposes. The lowest level of granularity is to click on a row or column heading of a table, thus selecting the entire row or column. Since tabular data can be used to display hierarchical data selections not all cells are directly comparable. This is true of crosstabs displaying dimensional information such as data from a multidimensional database as these dimensions are often hierarchical. Cells that are not directly comparable may not be compatible for a collective operation. When dealing with hierarchical data, it is desirable to have the ability to perform data selection operations on data at the desired hierarchical levels without being limited by how the data is displayed.

SUMMARY OF THE INVENTION

A computerized method and system for hinting and selecting multiple cells within a crosstab are described. In one embodiment of the invention, the method includes selecting at least one crosstab cell and displaying a set of hints over the cells that are compatible with the selected cell. The method also includes selecting a subset of the hints by selecting a desirable area of the crosstab, which will cause selection of compatible cells, and manipulating the selected data. Compatible cells are determined by compatibility by aggregation level, measure and the like.

In another embodiment of the invention, the system includes a hinting module operable to determine compatible cells associated with a user selection in a crosstab and a user selection correction module operable to ignore user selections not compatible with the selection, a memory to encompass the two modules, a display to render a GUI with an output of the execution of the hinting module and the user selection correction module and a processor operable to execute the instructions in the memory with the hinting module and the user selection correction module.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Described herein are methods and systems for providing hints for and selecting cells within a crosstab that belong to the same aggregation level. Providing hints manifests cells of the same aggregation level and the selection is limited to members of a compatible aggregation level.
}

Various features associated with the operation of the present invention will now be set forth. Prior to such description, a glossary of terms used throughout this description is provided. The definitions set forth herein are exemplary and are not intended to detract from any ordinary meaning of such terms in the art.

Drag-and-cover—Drag-and-cover comprises the action of clicking at one point and dragging to an arbitrary direction to cover an area of adjacent items. Drag-and-cover action may be used for selecting multiple items.

Focus—Focus is the item of a GUI which is currently identified. The item can be identified by hovering over (mouse over) operation, selection or be the region of a GUI that is activated and ready to accept inputs from a user.

Measure—A Measure is a quantity as ascertained by comparison with a standard, usually denoted in some unit, e.g., units sold, dollars. A measure, such as revenue, can be displayed for the dimension "Year". Corresponding measures can also be displayed for each of the values within a dimension. Measures can be a factor in determining compatible cells.

Figure 1:
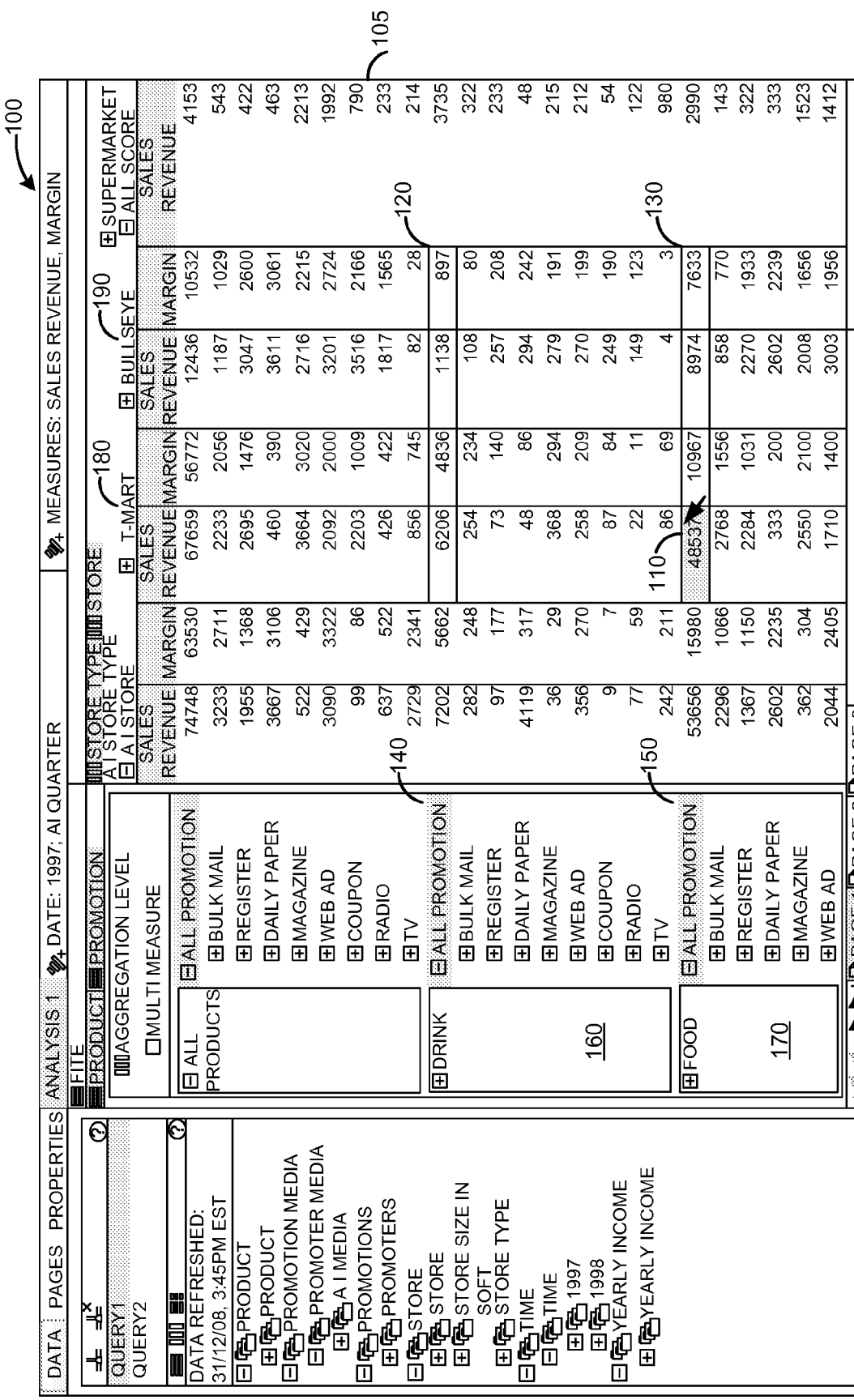
FIG. 1 is an exemplary screenshot of a graphical user interface (GUI) showing hinting of same aggregation level cells when selecting a single cell of a crosstab.

Crosstab—A crosstab (cross-tabulation) refers to visualization of data that, in one embodiment, displays the joint distribution of data related to two or more variables simultaneously so as to enable easy comparison of the data across the two or more variables. Crosstabs are usually presented in a matrix format that is why a crosstab is sometimes called a matrix. FIG. 1 illustrates an exemplary crosstab matrix. The data is organized in rows, columns and pages. Each cell shows the value associated with the specific combination of row and column headings. Dimension members are listed across the first row and down the first column; the data for measures appears in the cells that form the body of the crosstab. A crosstab can be used to display summary information and show how data varies across dimensions, such as sales by region by month.

Cube—A cube is a logical organization of measures along multiple dimensions. The edges of a cube contain dimension members and the body of a cube contains data values. For example, a sales cube may have edges containing members from the time, product, and customer dimensions. Volume sales and unit sales may be two measures in a sales cube. A cube can have three or more dimensions.

Aggregation level—Aggregation level is a term used to designate a level in a tree data structure. For example, the hierarchical levels in a multidimensional database are aggregation levels. In crosstabs, an aggregation level consists of the cells that are the same distance from a node (e.g., root node) or are designed by metadata as a level. For calculation purpose an aggregation level consists of the cells that belong to compatible hierarchical levels of data in a crosstab within which, for instance, data of a particular measure may have been aggregated along one or more dimensions. Therefore the cells within an aggregation level are related to each other and are compatible. However, aggregation operation is not limited to a summing operation but instead refers to any mathematical operation or analysis that can be performed on the data of a data cube.

Identified cell—The term identified is used for putting the cell in focus—that is the user identified cell is in focus. Identifying can include hovering over (mouse over) a cell or selecting a cell. The term identified is used for putting the cell in focus—that is the user identified cell is in focus. Identifying can include hovering over (mouse over) a cell or selecting a cell.

FIGS. 1, 2, 3, 4, and 5 are exemplary screenshots representing different situations of providing hints and selecting cells in a crosstab according to embodiments of the present invention. These screenshots show aspects of a workflow implemented in part by FIG. 6. The workflow includes a user interacting with a user interface that supports aggregation level hinting. In some embodiments, the user explicitly turns this feature on. Generally this workflow is applicable to crosstabs with two or more aggregation levels. Shown in the workflow are two related techniques. One, the so called hinting, which causes updating a user interface to show comparable cells to identified cells. Two, changing a user selection to include compatible cells.

Compatibility is based on measure, aggregation level, a mix of these, and the like. A compatible aggregation level includes members on the same aggregation level. Another compatible aggregation level is an equivalent level. For example, two hierarchies can be joined together for analysis. Metadata associated with the joining can designate equivalence of levels. A compatible aggregation level includes members based on the same measure. Another measure based compatibility is an equivalent measure. For example, the measure maybe revenue in US dollars but through metadata may designate an equivalent measure for example revenue in Euro dollars.

FIG. 1 illustrates an exemplary method of hinting the aggregation level of cells within a crosstab. Graphical User Interface (GUI) 100 includes a crosstab 105 with a user selected single cell 110. The selection brings the cell 110 in focus. The selection may be performed, for example, by clicking on the cell 110. The selected cell 110 is highlighted to indicate the user's intended focus and the item the user wants to perform an action on. The method of highlighting varies with embodiments but includes changing the color or fill pattern of the cell. The cell 110 may be bounded—altering the color or style of cell border, have a different shading, or both—as shown. The rest of the cells in the crosstab 105 are without highlighting or a different highlight. For example, groups of cells 120 and 130 are merely bounded (but not highlighted) which is, in accordance with this embodiment, the hint that these cells are within the same aggregation level as the selected cell 110. This indicates to a user that there is other compatible data in this crosstab which may be of interested or suitable as input to some group operation or manipulation. In FIG. 1, these cells 120 and 130 are comparable to cell 110. The hinted cells represent the measures "Sales Revenue" and "Margin" for two different members 180 and 190 of the "Store" dimension. They also correspond to the all promotions level 140 and 150 for product dimensions "Drink" and "Food". A selection of such cells can be used for various analysis purposes and since they are at compatible aggregation levels collective operations performed on them would be meaningful.

Figure 2:
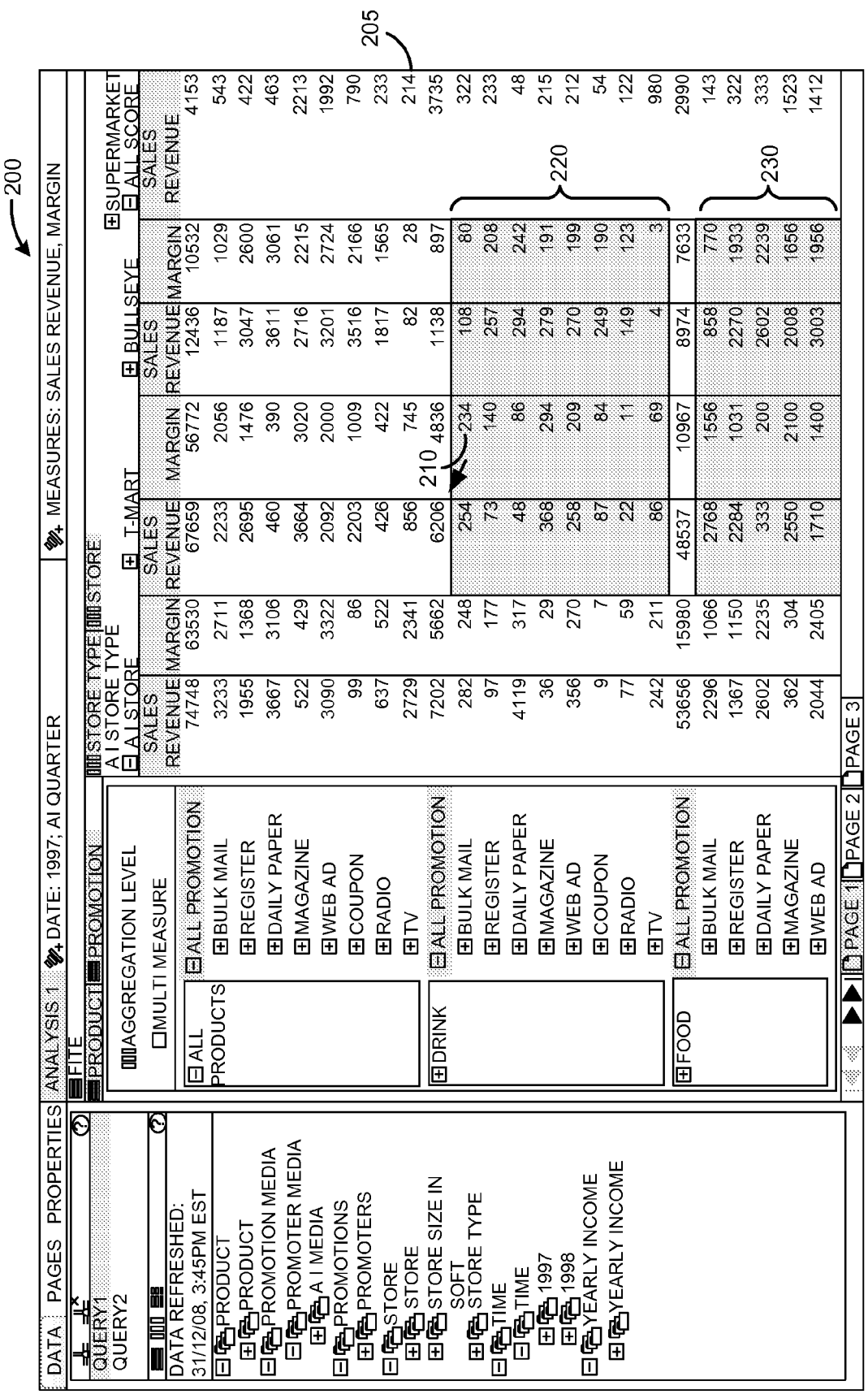
FIG. 2 is an exemplary screenshot of a GUI showing hinting of same aggregation level cells in case of mouse over event.

FIG. 2 is an example screenshot of a GUI 200 showing hinting of compatible cells in the case of mouse over event. In contrast to FIG. 1, in FIG. 2 there is no selection of a cell from crosstab 205, but the hints are responsive to the current position of a pointing device, such as, a mouse. For example, moving the cursor over a cell 210, triggers an update to the GUI 200. The update hints the cell groups 220 and 230, which are compatible with each other by aggregation level, via highlight such as the shading shown. Hovering over a cell may trigger additional highlighting of the cell 210 (not shown). Hovering is where the user rests the cursor over the cell without moving it off the cell.

Figure 3:
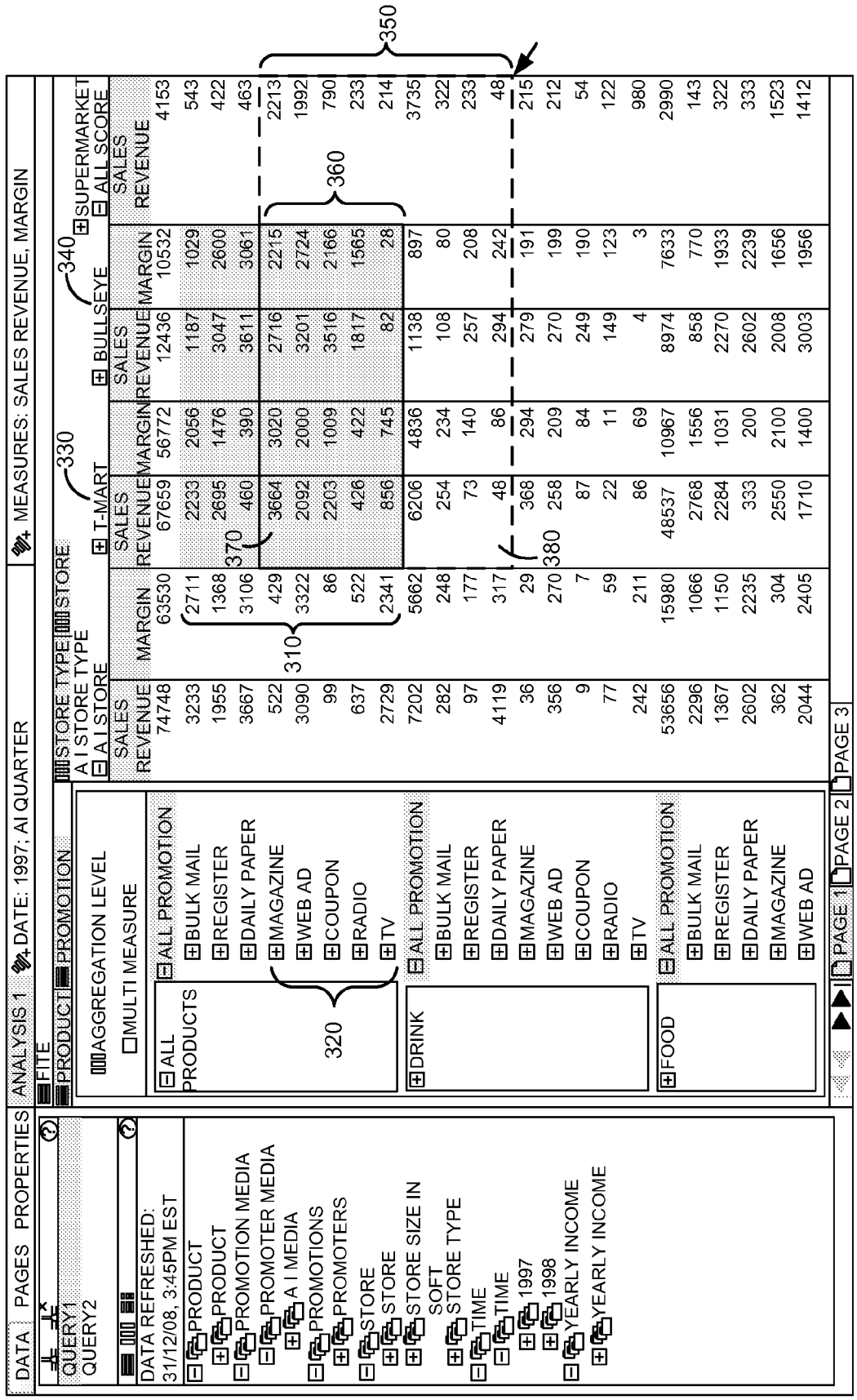
FIG. 3 is an exemplary screenshot of a GUI showing hinting of same aggregation level cells while selecting cells in a crosstab.

FIG. 3 is an example screenshot of a GUI showing changing a user selection of cells within a crosstab because of the aggregation level of the underlying cells. The resulting selected cells are the intersection of the set of cells selected by the user and the set of cells having the same aggregation level as the first cell selected as part of the user selection. As already explained in FIG. 1 and FIG. 2, if a user tries to make a selection of cells, the hinting function will show all the cells that are in compatible aggregation levels. In FIG. 3, the user selection 350 crosses the boundaries of cells from the compatible aggregation level 310 to the cell 370. Here, the selection 350 crosses boundary between "all products" and "drink" in the product dimension on the crosstab's vertical axis. According to one embodiment, highlighted and bounded cells 360 are an intersection of the cells from the same aggregation level 310 and the user selection 350. They represent "Sales Revenue" and the "Margin" for a subset of promotions 320, within the "Promotion" dimension, done in the stores 330 and 340. When indicating the user selection, the area of user selected cells 350 can be bounded in one way (e.g., with a dashed line), and the cells that are in compatible aggregation level 360 can be bounded in a different way, for example with a solid line. The comparable cells can be highlighted in a third way, for example by shading. Thus, the user selection 350 is modified to enforce the compatibility of aggregation levels to form the modified selection 360, represented in a solid line bounded box, which is now ready for group manipulation. In this example, the selection 350 has started from the upper left corner to the bottom right corner. Hence the basis for the hints 310 is the upper left cell 370 from the selection 350. If the selection 350 has started from a cell from the lower level "Drink", for example cell 380, then the basis for the hints and the modified selection would be this lower level "Drink". In other embodiments, the criteria for the basis of the hints and the selection may be, for example, the upper level or the lower level to be taken as the basis by default.

Figure 4:
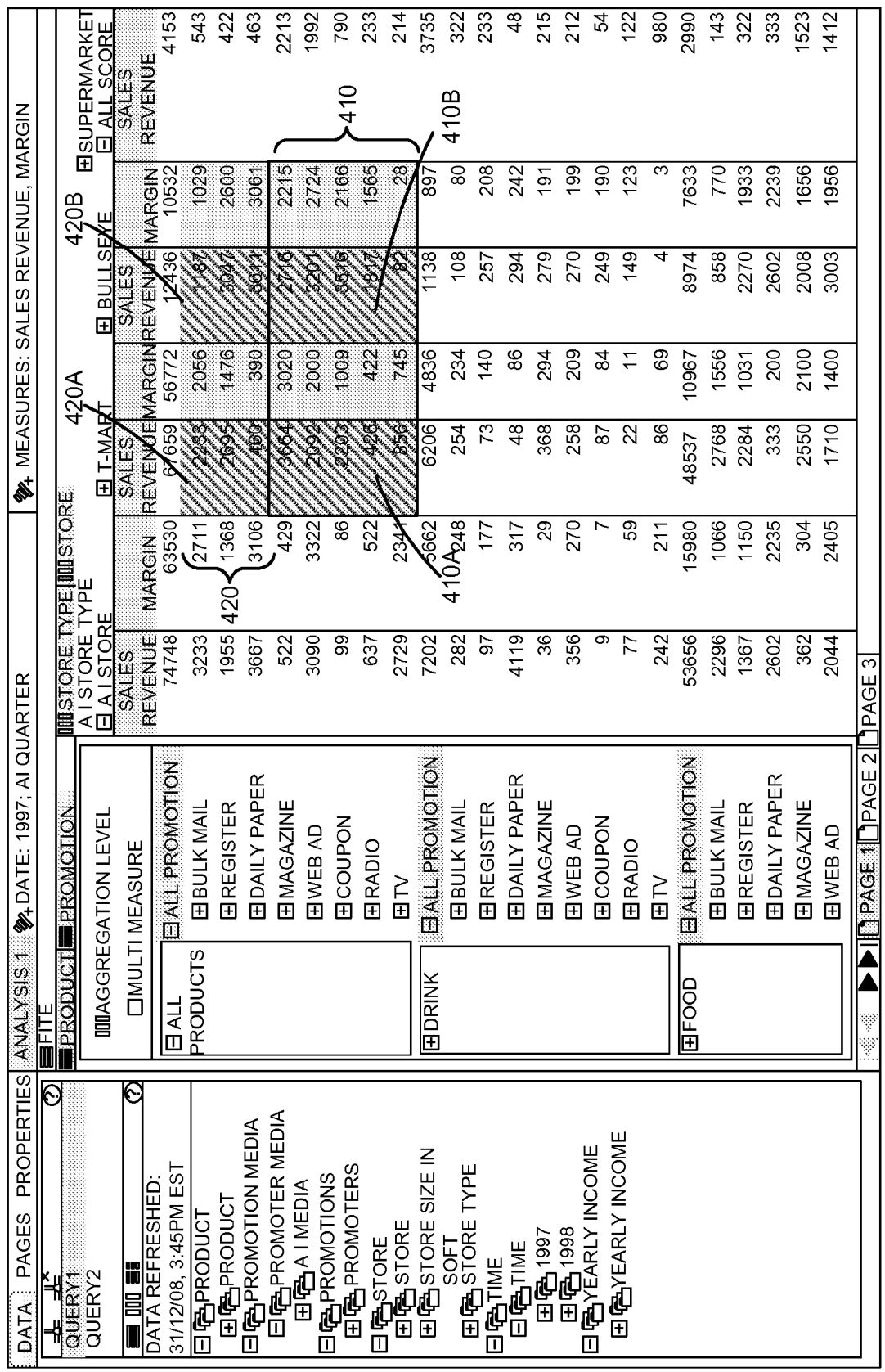
FIG. 4 is an exemplary screenshot of a GUI showing changing a user selection in a crosstab because of the aggregation level of the underlying cells.

FIG. 4 represents a selection of cells that are represented as highlighted and bounded 410, and also some other cells, belonging to the same aggregation level and same measure, which are highlighted only 420. The modified selection of cells 410 is the cells in the same aggregation level and same measure, as selected by the user. Although all the cells of the same aggregation level and measure are highlighted 410 and 420, only the bounded cells 410 are actually selected and may be manipulated. Here, the highlighted and shaded cells 410A are associated with the Sales Revenue for T-Mart and highlighted and shaded cells 410B are the same measure but for Bullseye. The hinting of the non-selected cells 420 is useful, for example, in order to the user to be prompted what other cells may be included in this selection 410, if desired. Cells 420A share the same measure as 410A but are outside the selection. Cells 420B and cells 410B are similar analogues. In an embodiment, the cells of compatible aggregation levels 420 that fall outside the modified selection 410 are not highlighted after the modified selection has been defined. In another embodiment, they are highlighted in a different manner to the modified selection 410.

Figure 5:
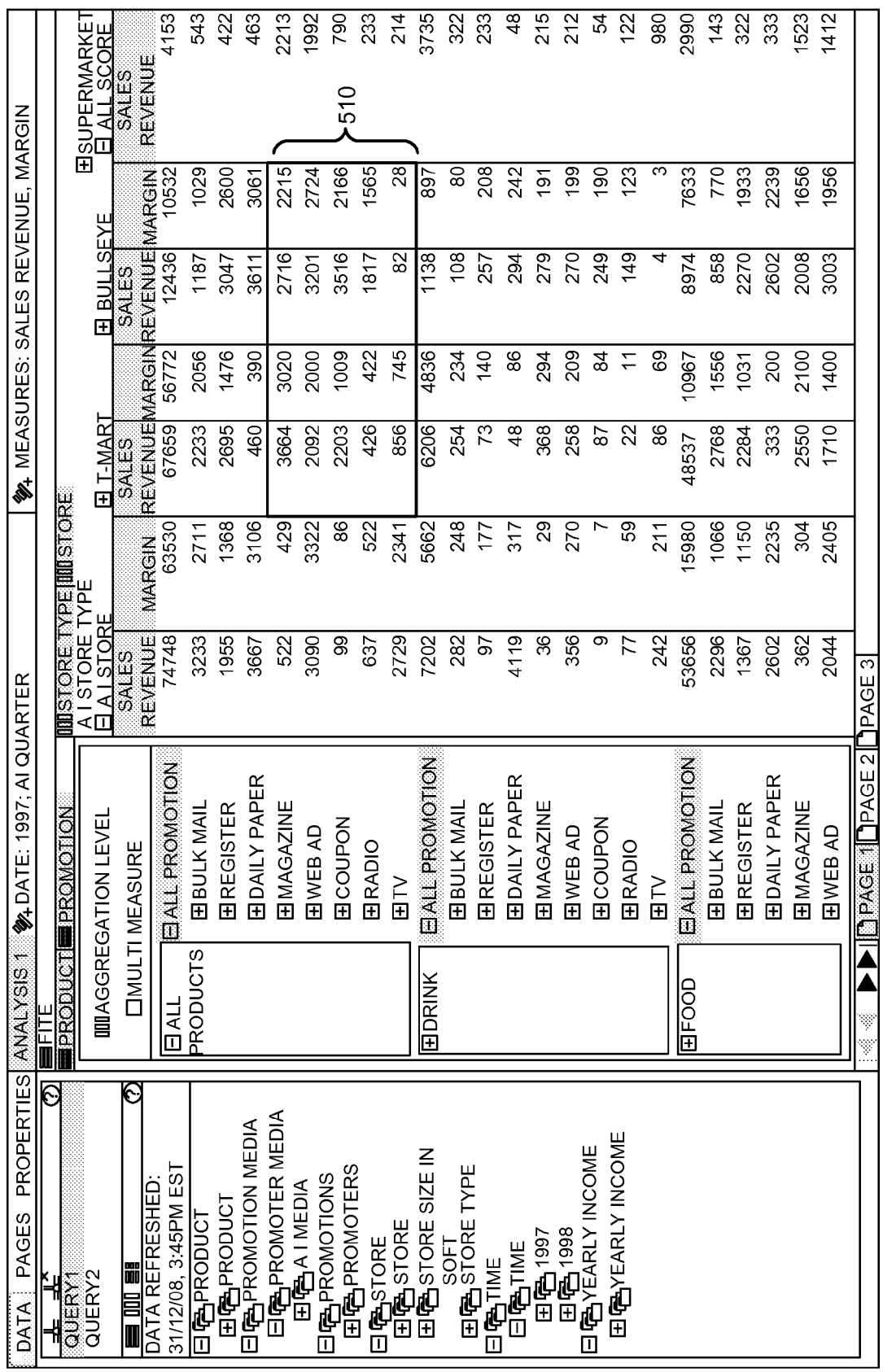
FIG. 5 is an example screenshot of a GUI showing a selection of compatible cells in a crosstab without hinting.

FIG. 5 is an example screenshot of a GUI showing a selection of compatible cells in a crosstab. In this case no hinting is presented and the selected cells 510 may be manipulated. FIG. 5 illustrates the scenario of what will appear if the cursor is not situated over any of the cells or situated over a cell with no compatible cells in the GUI. FIG. 5 also illustrates the scenario if the feature is not employed. Each case lacks the hints that exist in FIG. 4.

Typically, selecting a row or a column in a crosstab will result in selecting values that span across several hierarchical levels and or measures. However, this may interfere with normal operations on occasion. Therefore in one embodiment, aggregation level hinting and selection may be activated as an alternative method for user selection of data. The alternative method could be evoked, for example, by a specially designed button within the crosstab component toolbar to switch between the standard and the alternative mode for selection.

Figure 6:
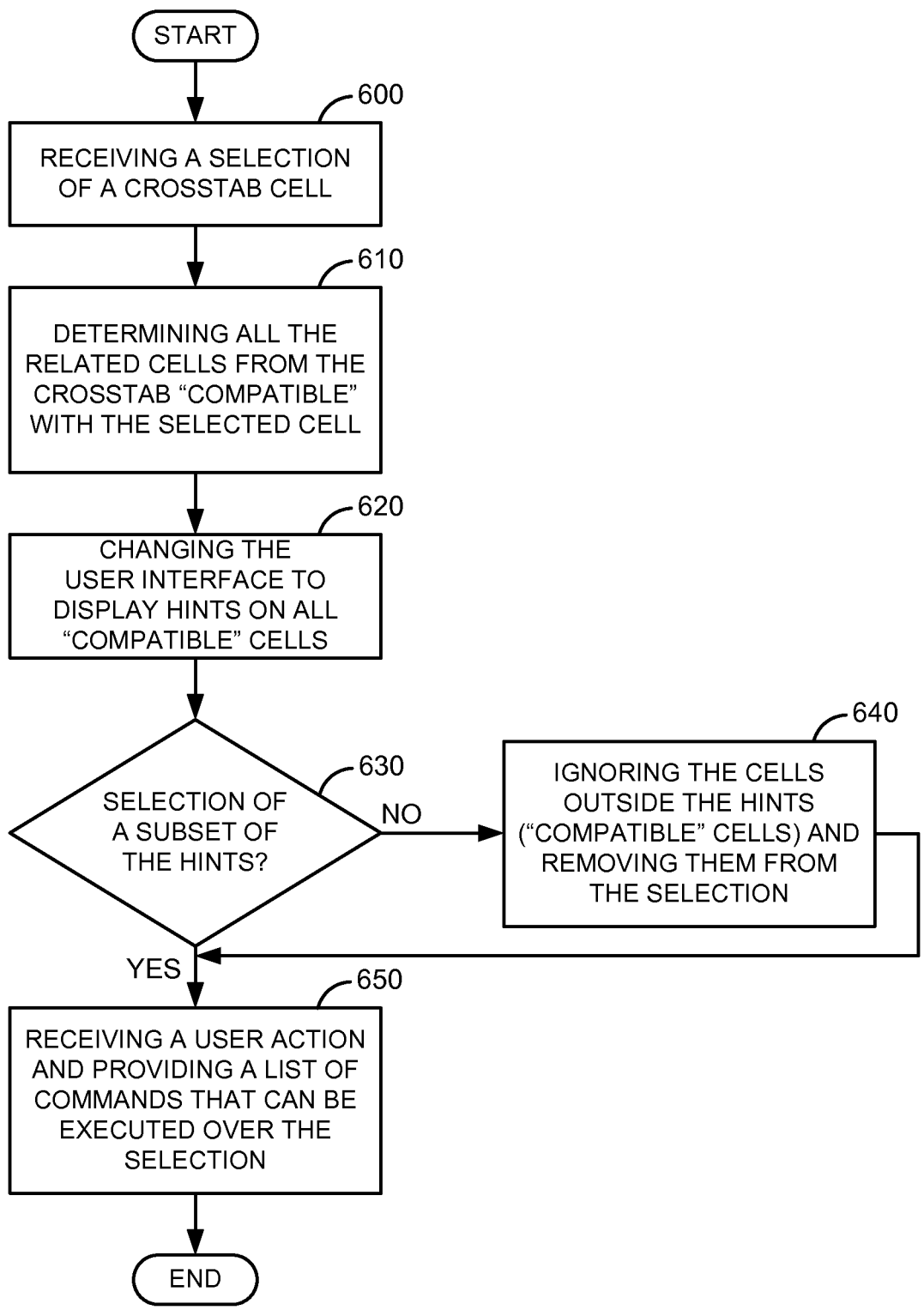
FIG. 6 is a flow diagram of an embodiment of the invention for hinting and selecting multiple cells within a crosstab.

FIG. 6 is a flow diagram of an embodiment of the invention providing hints for and selecting multiple cells within a crosstab based on the provided hints. This flow diagram can further include steps such as receiving a user's action to turn on aggregation level hinting. At block 600, a crosstab cell is identified. The identification of the cell may be done by any input that comes from an input device such as a mouse or a keyboard. For example, a point-and-click action from a pointing device could contribute to the selection of a desired cell. As well, hovering over a cell can bring it into focus and identify it. At block 610, all cells compatible with the identified cell are determined. In one embodiment, these cells are within the same aggregation level as the identified cell. In another embodiment, these cells associated with the same measure. Further, at block 620, the GUI is changed so that hints are displayed on all those related cells determined in block 610. In one embodiment, the hints are in the form of highlights, showing the aggregation level (e.g., as shown in FIG. 2 by cells 220 and 230). Thus, the aggregation level corresponding to the selected cell is manifested. For analysis purposes, a need could arise for the crosstab to represent only the cells within a specific level of aggregation and associated with a specific measure (e.g. FIG. 4). Hints as to aggregation level may be necessary when different hierarchy levels are being displayed in the crosstab. If all members are compatible, there may be no need for hints for their associated cells. Alternatively, if all the cells are compatible, all are highlighted.

A selection of some of the cells in the crosstab could be performed in order to be performed some action on them. If, at decision block 630, the identified cells are a selection and the selection comprises only compatible cells, for example cells 410 in FIG. 4, then, in block 650, the user is given the option to select an action for this selection and execute a command on the selection. The action could be, for example, cutting or copying the cells in the selection or building a chart based on the data from the selection.

If, at block 630, the selection is broader and include incompatible cells, then in block 640, the selected cells outside the aggregation level or associated with a different measure, are ignored and removed from the selection. An example for that is presented in FIG. 3. The broader selection 350 is shown with dashed line. The remaining selection 360 is both part of the initial broader selection 350 and the cells 310 that are within the same aggregation level. In that example, the hints are visualized by highlights. Further, the remaining selection is ready to be manipulated in block 650 as already explained above by selecting a command from a menu.

In some embodiments, the method of FIG. 6 further include selection of a set of compatible cells when the selection includes many sets of compatible cells. When user's action results in a selection of cells belonging to two or more sets of compatible cells one set is determined. Determining the set is based on the compatibility criteria used, for example, aggregation level or measure. A set of compatible cells can be the cells that are at compatible aggregation level as the user selected cell. The determination of a set from amongst the many sets of compatible cells is made by selection of an extreme (i.e., highest or lowest) level in the plurality aggregation levels represented in the user' selection. Then, finding the cell in that aggregation level. In another embodiment, the selection is made on the basis of measure. In this case, measures have an ordering such that there is a highest and a lowest measure. An extreme measure is selected.

Figure 7:
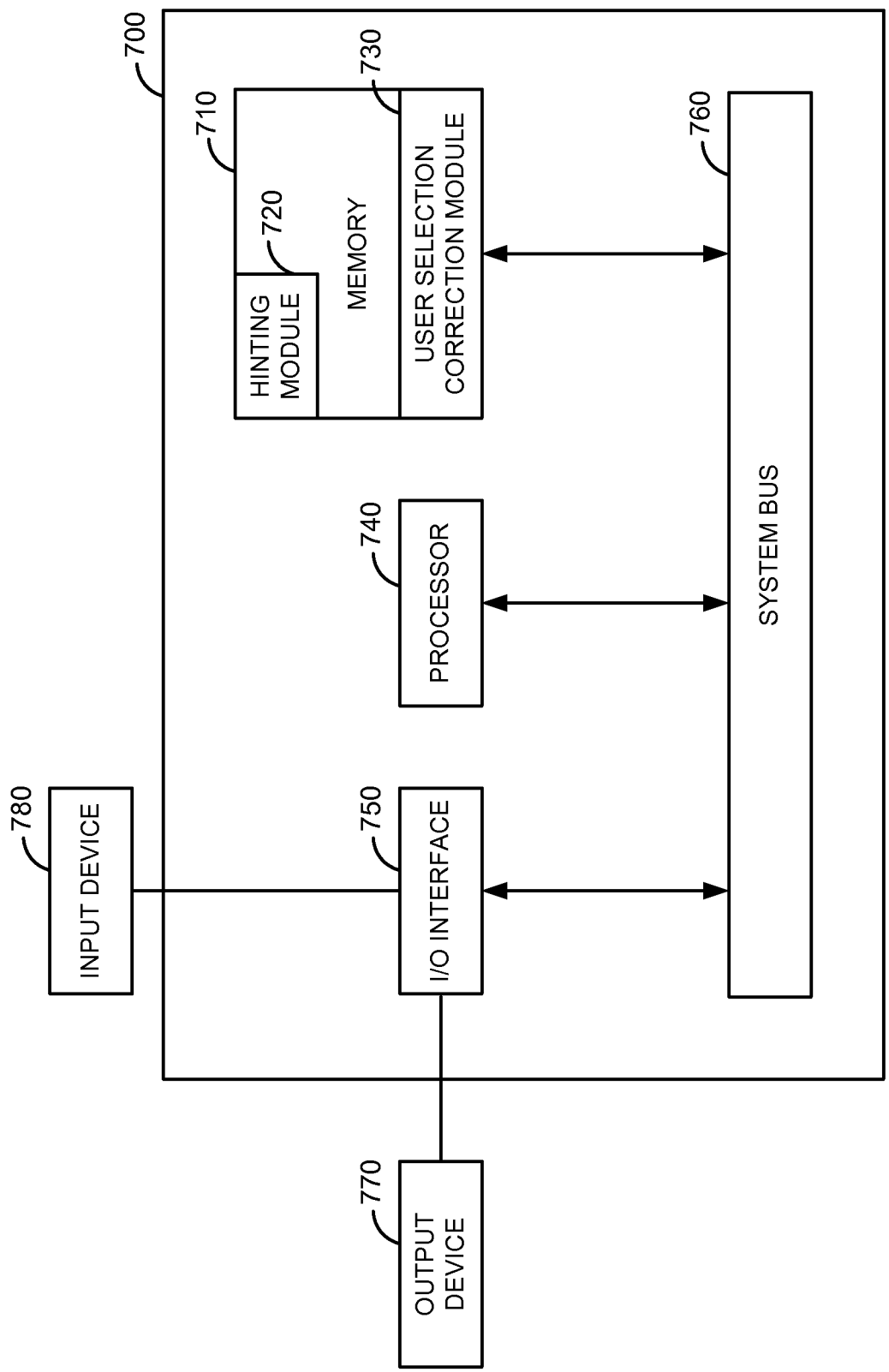
FIG. 7 is a block diagram of an embodiment of the invention for a computer system to hint and select multiple cells within a crosstab.

FIG. 7 is a block diagram of an embodiment of the invention for a computer system 700 to hint and select multiple cells within a crosstab. The computer system 700 incorporates a memory 710, a processor 740, and an I/O interface 750. The memory 710, the processor 740, and the I/O interface 750 may communicate with each other via a system bus 760. The memory 710 encompasses a hinting module 720 and a user selection correction module 730. An output device 770 such as a display, and an input device 780, such as a keyboard or a mouse, are connected to the system 700 via the I/O interface 750. The hinting module 720 is able to manipulate crosstab data. The manipulation is performed and visualized in a graphical user interface (GUI), rendered on the display 770. The hinting module 720 is operable for hinting to the user which cells of a crosstab are compatible with the cell or cells in focus in the GUI. The user selection correction module 730 is operable to provide alternative selection for data in a crosstab. The system receives a selection of multiple cells from a crosstab and the corrected selection will comprise these members of the covered area that were previously hinted as being within the same or equivalent aggregation level and or measure. Thus, the alternative selection limits the user selection to members compatible for the purposes of visualization, exporting, further calculation, and the like.

An embodiment of the present invention relates to a computer storage product with a computer-readable medium having computer code tangibly stored thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine executable software instructions.

The foregoing description, for purposes of explanation, used specific nomenclature to provide a thorough understanding of the invention. However, it will be apparent to one skilled in the art, that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and the equivalents define the scope of the invention.

What is claimed is:

1. A non-transitory computer readable medium comprising computer readable instructions, which, when executed by a computer, causes the computer to perform a method, comprising:
receiving a first user action identifying at least one cell of a crosstab, wherein the crosstab comprises hierarchical multidimensional data;
determining at least one other cell from the crosstab, wherein the at least one other cell is within a set of cells compatible by aggregation level and measure with the at least one user identified cell;
modifying a user interface to display hints on the set of cells compatible by aggregation level and measure;
receiving a second user action selecting a portion of the crosstab, wherein the selected portion includes at least one cell of the set of cells compatible by aggregation level and measure associated with the hints and cells outside the set of cells compatible by aggregation level and measure associated with the hints;
in response to receiving the second user action selecting the portion of the crosstab, removing cells from the selected portion that are outside the set of cells compatible by aggregation level and measure associated with the hints, wherein the cells removed from the selected portion are associated with a different measure than the measure used for the cells compatible by aggregation level and measure; and
displaying a list of commands on the user interface for execution with respect to the cells of the changed selected portion associated with the hints.

2. The computer readable medium of claim 1, wherein receiving the first user action comprises receiving a mouse click event.

3. The computer readable medium of claim 1, wherein receiving the first user action comprises receiving a mouse over event.

4. The computer readable medium of claim 1, wherein receiving the second user action comprises receiving the selection of at least one cell associated with the hints other than the cell identified based on the first user action.

5. The computer readable medium of claim 1, wherein the hints and the changed selected portion comprise the at least one cell selected from the first user action.

6. The computer readable medium of claim 1, wherein the first user action identifying the at least one cell of the crosstab performs selection of the at least one cell.

7. The computer readable medium of claim 1, wherein the user identified at least one cell is brought into focus by the first user action.

8. A computer implemented method for hinting and selecting a plurality of cells in a crosstab, displayed on a user interface, comprising:
receiving a first user action selecting at least one user selected cell of the crosstab, wherein the crosstab comprises hierarchical multidimensional data;
determining at least one additional cell from the crosstab, wherein the at least one additional cell is within a set of cells compatible by aggregation level and measure with the at least one user selected cell;
modifying the user interface to display hints on the set of cells compatible by aggregation level and measure;
receiving a second user action selecting a portion of the crosstab, wherein the selected portion includes at least one cell of the set of cells compatible by aggregation level and measure associated with the hints and cells outside the set of cells compatible by aggregation level and measure associated with the hints;

in response to receiving the second user action selecting the portion of the crosstab, removing cells from the selected portion that are outside the set of cells compatible by aggregation level and measure associated with the hints, wherein the cells removed from the selected portion are associated with a different measure than the measure used for the cells compatible by aggregation level and measure; and displaying a list of commands on the user interface for execution with respect to the cells of changed selected portion associated with the hints.

9. The method of claim 8, wherein receiving the first and second user action comprises receiving a mouse click event.

10. The method of claim 8, wherein receiving the first and second user action comprises receiving a mouse over event.

11. The method of claim 8, wherein receiving the second user action comprises receiving the selection of at least one cell from the set of compatible cells other than the at least one cell selected from the first user action.

12. The method of claim 8, wherein the set of compatible cells and the changed selected portion comprise the at least one cell selected from the first user action.

13. The method of claim 8, wherein the first user action results in a selection of cells belonging to a plurality of measures and determining the at least one compatible cell from the crosstab that is associated with the same measure as the user selected cell comprises:

determining an extreme measure in the plurality of measures; and determining at least one cell from the crosstab that is associated with the same measure as the extreme measure in the plurality of measures.

14. The method of claim 8, wherein the first user action results in a selection of cells belonging to a plurality of aggregation levels and determining the at least one cell from the crosstab that is in the compatible aggregation level as the user selected cell comprises:

determining an extreme level in the plurality of aggregation levels; and determining at least one cell from the crosstab that is in the compatible aggregation level as the extreme level in the plurality of aggregation levels.

15. A computer system for hinting and selecting a plurality of cells in a crosstab displayed on a user interface, comprising:

a memory, the memory having stored thereon executable instructions related to:

a hinting module operable to determine at least one cell from the crosstab, wherein the crosstab comprises hierarchical multidimensional data, and wherein the at least one cell is within a set of cells compatible by aggregation level and measure with a user selected cell and the hinting module is further operable to modify the user interface to display hints on the set of cells compatible by aggregation level and measure;

a user selection correction module operable to, in response to receiving a user action selecting a portion of the crosstab, wherein the selected portion includes at least one cell of the set of cells compatible by aggregation level and measure associated with the hints and cells outside the set of cells compatible by aggregation level and measure associated with the hints, remove cells from the selected portion that are outside the set of cells compatible by aggregation level and measure associated with the hints, wherein the cells removed from the selected portion are associated with a different measure than the measure used for the cells compatible by aggregation level and measure;

a processor operable for executing the instructions in the memory with the hinting module and the user selection correction module; and a display to render an output of the execution of the hinting module and the user selection correction module.

16. The computer readable medium of claim 1, wherein the compatible cells are compatible by one or more criteria selected from a group consisting of: compatibility by measure, same measure, and equivalent measure.

17. The method of claim 8, wherein the cells in the set of compatible cells are compatible by one or more criteria selected from a group consisting of: compatibility by measure, same measure, and equivalent measure.

* * * * *